United States Patent [19]
Rose

[11] Patent Number: 5,689,274
[45] Date of Patent: Nov. 18, 1997

[54] DOPPLER RATE AND ANGLE RATE PASSIVE EMITTER LOCATION

[75] Inventor: Conrad M. Rose, Dahlgren, Va.

[73] Assignee: Litton Systems, Inc., Woodland Hills, Calif.

[21] Appl. No.: 603,367

[22] Filed: Feb. 20, 1996

[51] Int. Cl.[6] .................. G01S 5/02; G01S 1/24; G01S 13/08

[52] U.S. Cl. .................. 342/417; 342/387; 342/146

[58] Field of Search .................. 342/417, 418, 342/420, 145, 146, 458, 387

[56] References Cited

U.S. PATENT DOCUMENTS 5,570,099  10/1996  DesJardins .................. 342/378

*Primary Examiner*—Gregory C. Issing
*Attorney, Agent, or Firm*—Gerald L. Lett

[57] ABSTRACT

Method and apparatus for passive emitter location which overcomes the time to range and other restrictive limitations of passive tracking systems by combining pulse frequency, time of arrival and bearing or angle of arrival measurements to obtain a range measurement at each parameter update. No specific observer motion is required and relatively few restrictions on emitter motion are present in order to obtain an accurate determination.

6 Claims, 6 Drawing Sheets

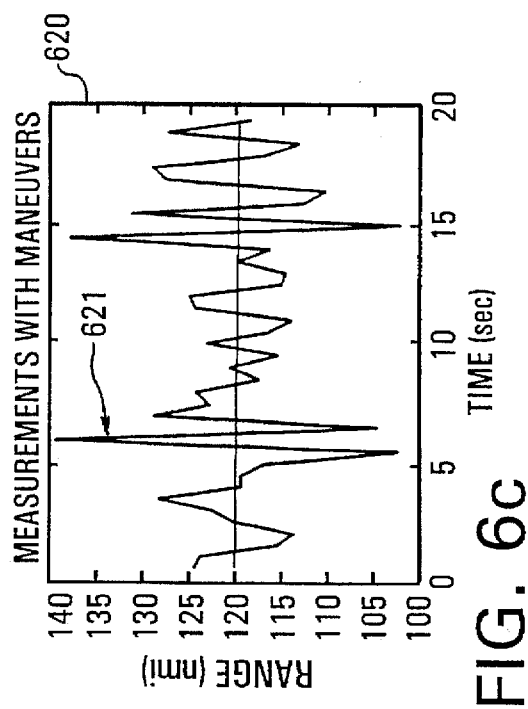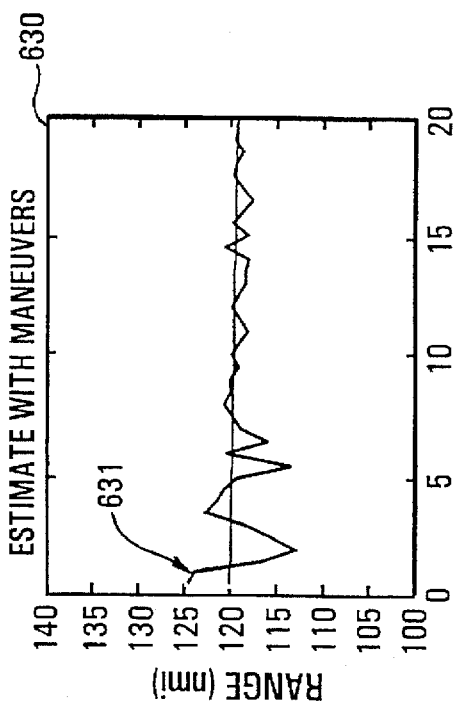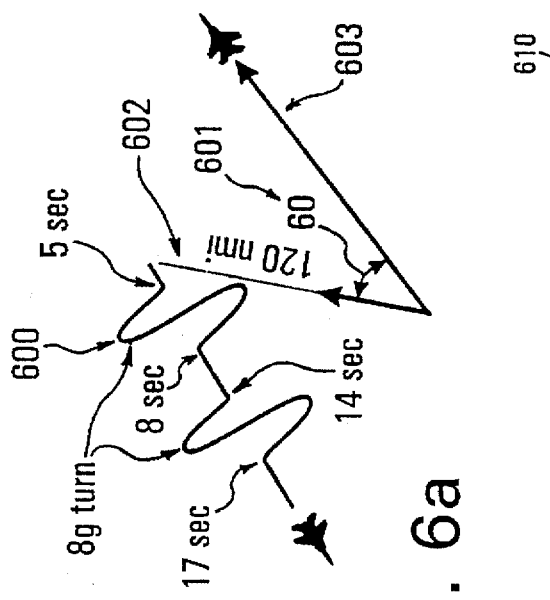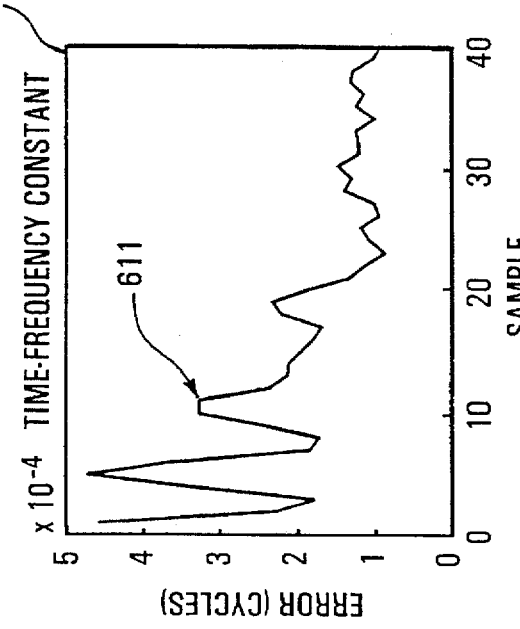

DOPPLER RATE AND ANGLE RATE PASSIVE EMITTER LOCATION

BACKGROUND OF THE INVENTION

This invention relates to the passive tracking in position and velocity of pulsed radar emitters by an ESM intercept receiver system. The ESM receiver makes measurements involving the following parameters: RF carrier frequency, pulse time-of-arrival (TOA), and signal angle-of-arrival (AOA) or AOA rate of change.

The location of nonstationary emitters from moving observers using relative bearing measurements or frequency change measurements is well documented in the literature. For example, bearings-only passive ranging is discussed in V. J. Aidala and S. E. Hamel, "Utilization of Modified Polar Coordinates for Bearing-Only Tracking," *IEEE Transactions on Automatic Control*, vol. AC-28, March 1983; while Doppler-only ranging is presented by Yiu-Tong Chan and Frederick L. Jardine in "Target Localization and Tracking from Doppler-Shift Measurements," *IEEE Journal of Ocean Engineering*, vol. 15, Jul. 1990.

FIGS. 1a and 1b illustrate prior art bearings-only passive location. As discussed by Aidala and Hamel, the observer 100 must maneuver to obtain the range to the emitting aircraft 110. The maneuver may be a change in speed, a change in heading, or both. The track 120 illustrates a change in heading, and graph 130 in FIG. 1b indicates the resulting behavior of the range estimate 140. Convergence occurs in this example after four bearing samples 150 are made at points (1–7) 151 along the observer's track. Four initial samples 152 are required because of the four state elements that characterize the emitter's track in this planar example: position, e.g. longitude and latitude, and speed along two different directions, for example north and east. The range estimator 141 relates the bearing measurements 150 to these four quantities and refines the estimates with subsequent samples to obtain some predetermined accuracy in the track estimate, such as the range estimate to within 5% of the true range. Achieving the theoretically desired performance in practice depends heavily on the emitting aircraft flying the assumed type of track. Aidala and Hamel, for instance assume the emitter's track is of constant velocity.

FIGS. 2a and 2b illustrate an implementation of Doppler rate ranging as described by Chan and Jardine but modified in an obvious way to apply to the pulsed radar air-to-air tracking problem. Measurements are made of the emitter RF carrier frequency, or pulse repetition (PRF) frequency 200. These measurements are differenced at 210 to compare the frequency change between the measurement samples, numbered sequentially 220. The frequency change is due to the Doppler shift induced by the relative velocity of the two moving aircraft. This set of frequency changes can be related to the emitter's track state vector, i.e. latitude, longitude and the north and east speeds analogous to the bearings-only case. As in the bearings-only example, four inputs are required before an initial target range estimate 240 is obtained as indicated in graph 239. This means five frequency measurements are required, as opposed to four bearing measurements. Another difference between the cases is that the observer is flying a constant velocity track 250. As Chen and Jardine note, this will result in an ambiguous solution, indicated by the ghost range 241. In the air-to-air application it may be possible to eliminate the ghost range by signal amplitude comparison between antennas in different quadrants. The ghost range is also eliminated if the observer maneuvers.

The Doppler technique, as described by Chen and Jardine, thus suffers two of the basic limitations of bearings-only passive ranging: it takes an extended time for emitter range to be obtained from the measurements, and during this time special restrictive assumptions are required about the emitter's motion. Most commonly, (as in the bearings-only case), the emitter is assumed to be flying a constant velocity track during the time needed to range. The time period this assumption must remain in effect extends from tens of seconds to minutes depending on relative observer and emitter kinematics.

This constant velocity emitter requirement is a severe limitation on the usefulness of these current approaches to passive emitter location. In many tactical situations where passive location is useful emitting aircraft avoid constant velocity flight paths to make tracking difficult. Therefore the aircraft may fly a constant velocity track only for several seconds, which is a period too short for conventional passive location estimators to converge to a solution.

Restrictions on the observer's flight path also impose severe tactical limitations. The need to maneuver to obtain range observability for bearings-only tracking may be difficult to satisfy on initial detection of the emitter, while any delay in maneuvering can significantly extend the track estimation convergence time. Eliminating the ghost track for the constant observer velocity Doppler case may require the observer to sample signals from antennas in different quadrants sequentially, and this introduces other restrictions, such as bounding the observing aircraft's attitude changes during this sequential sampling.

A contrast to the limitations of passive tracking using either frequency change or bearing measurements is the operation of a tracking radar, such as the prior art radar illustrated in FIGS. 3a and 3b. By emitting pulses and measuring the time delay for the pulse return the radar obtains a direct measurement of range, rather than indirectly deriving the range after four or five measurements have been made. Also each range measurement is intrinsically more accurate than the passively derived range, even after many measurements have been made in the passive approaches.

Still there are restrictions and limitations in using the active radar. A significant limitation is the possibility of being passively tracked by an observer beyond the detection range of the radar. As indicated by the target range 310 in FIG. 3b, the active radar can detect a target tens of miles distant. But because an ESM intercept receiver detects the direct, and not the reflected signal, it can detect the radar at distances of hundreds of miles. This was indicated in FIGS. 1 and 2 by the emitter range of 120 nautical miles (nmi) as opposed to 20 nmi for the radar.

A significant restriction in using the radar illustrated in FIG. 3a to track a target is the need to steer the high gain antenna 320 (either mechanically using servo 321, or electronically) to point at the aircraft being tracked. This may restrict the trajectory of the observing aircraft, for instance in order to generate the azimuth and emitter measurements 322. This may restrict the trajectory of the observing aircraft, for instance, to essentially one in which the observer's velocity vector is pointing toward the target. In contrast, passive techniques can use an interferometer array (170, FIG. 1) to simultaneously locate multiple emitters in angle over a wide field-of-view (FOV).

From these considerations of the benefits and weaknesses of both active and passive tracking systems it is clear that the prior art fails to describe a passive system that can generate an accurate range measurement from a detection range of possibly hundreds of miles at each parameter update without significantly restricting either observer or emitter motion.

It is an therefore an object of the invention to provide means and method for utilizing signal frequency and time Doppler measurements along with bearing change measurements, all made during a single dwell, in a manner that reduces the emitter constant velocity requirement from that needed in using existing techniques.

It is a further object of this invention to provide means and method for eliminating ambiguous range solutions when the observer flies a constant velocity track, and to not require the observer to maneuver in order to estimate emitter range.

It is also an object of this invention to provide a way for obtaining a measurement of emitter range during each dwell, after an initialing first dwell.

A further object of the invention is to utilize the foregoing range measurements in a passive track estimator to refine the range accuracy and to predict future radar positions in a manner similar to that currently done in active radar trackers.

SUMMARY OF THE INVENTION

The foregoing and other objects are achieved according to the invention by combining pulse frequency, time of arrival (TOA) and bearing or angle of arrival (AOA) measurements to obtain a range measurement at each parameter update. No specific observer motion is required, and the restrictions on emitter motion, heretofore experienced, are reduced.

BRIEF DESCRIPTION OF THE DRAWINGS

The principles of the invention will be more readily understood by reference to a description of preferred embodiments thereof given below in conjunction with the drawings which are briefly described as follows.

FIG. 1b is a range diagram for the FIG. 1a system resulting from the measurements taken as shown in FIG. 1a.

FIG. 6a illustrates an emitter track flown in a simulation using the invention.

FIGS. 6b–d are graphs, illustrating the results of the FIG. 6a simulation.

DETAILED DESCRIPTION OF THE PREFERRED EMBODIMENTS

Figure 4A:
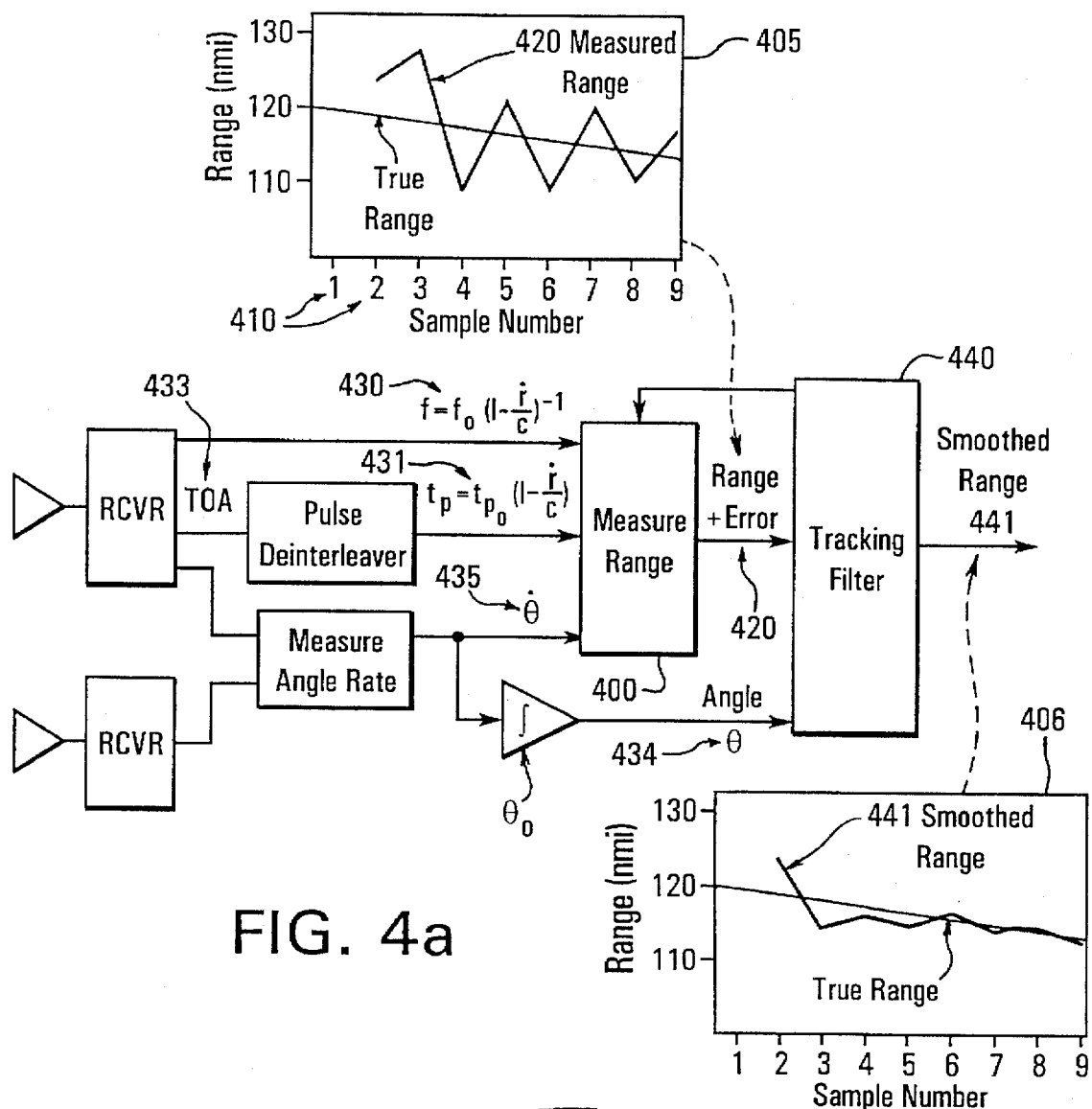
FIG. 4a is a top level block-schematic diagram of the first preferred embodiment of a passive emitter location apparatus constructed according to the invention.
Figure 4B:
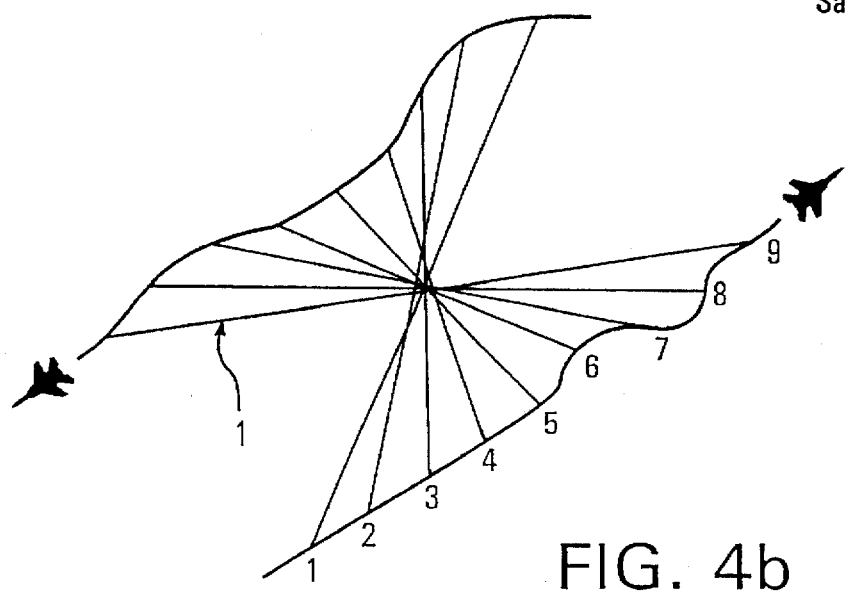
FIG. 4b is a chart illustrating a typical relation between emitter and observer in using the FIG. 4a system.

FIG. 4 illustrates a processor 400 combining RF carrier frequency measurements 430 with the fundamental time differences 431 $t_p$, derived from pulse TOA measurements 433, and angle rate measurements 435 to obtain a range measurement. As indicated by the graph 405 of range versus parameter sample number (equivalently receiver dwell), as obtained from the output of 400 the range measurements are available after a second parameter update. This is in contrast to an active radar, where the range measurement is available after the first update. It will be clear from the following description how this invention utilizes changes in RF, PRF and angle to measure range, and two parameter updates, or receiver dwells, are required to initially obtain these rates. However, unlike current passive location techniques, range is measured at the second and all subsequent updates. This range is not refined with subsequent updates by processor 400, but exhibits an essentially random error with fixed statistics, analogous to the active radar range measurements.

The error in the passive range measurement using the invention is intrinsically larger than that of the active radar. This error depends on the system frequency measurement accuracy, as well as TOA and angle resolution measurement capability. For time resolutions of 2.5 nsec, frequency accuracies of 5 Hz and angle rates with an error no more than 0.1° per second, a 10 GHz emitter's range can be measured to a 1σ accuracy of about 6%. Although this measurement error is much larger than the error attainable with an active radar, the passive measurement can be made for emitters at much longer ranges than the active radar can detect. In contrast to conventional bearings-only and Doppler techniques, the range estimate is smoothed in a tracking filter similar to those used by active radar trackers. The tracking filter 440 takes the range and angle measurements and generates the emitter position 441 and velocity.

As noted above, the operations of this invention are thus seen to have more similarities to a tracking radar than to conventional passive ranging systems. The reason for this involves the manner in which the time measurements 431, frequency measurements 430, and angle rate measurements 435 are combined in the range measurement processor 400. This is shown in more detail in FIG. 5. As shown there the frequency and time interval measurements $t_p$ are multiplied to produce the quantity 500 $N_c$. As will be seen, this quantity provides an absolute reference that provides the basis for extracting range, since it gives a true Doppler change (501, FIG. 5) without any knowledge of emitter carrier $f_o$ or pulse repetition $1/t_{po}$ rest frequencies.

The manner in which $N_c$ does this makes use of the method and apparatus described in the applicant's commonly assigned patent application "Emitter Frequency-Time Measurement by a Moving Observer Using No Navigation Inputs". For all pulsed echo radars this fundamental constant represents the number of carrier cycles that occur in the time interval $t_p = 1/f_{PRF}$, where $f_{PRF}$ is the fundamental pulse repetition frequency. Intrinsic to this invention is the relation 501 FIG. 5 of $N_c$ to the relative acceleration $\ddot{r}$ along the signal's angle-of-arrival (AOA), and to changes in the carrier frequency f and fundamental pulse repetition frequency $t_p$:

$$\Delta t_p \Delta f = -N_c \left( \frac{\ddot{r}}{c} \Delta t \right)^2 \quad (1)$$

All quantities in this equation are known except the relative kinematical acceleration $\ddot{r}$, which can thus be solved for utilizing Equation 1.

Whereas the estimation of the constant $ft_p$ or equivalently $N_c$ takes place over one dwell, the estimation of the product $\Delta f \Delta t_p$ takes place typically over two dwells. f and $t_p$ estimates from each dwell are stored in memory 520, and then the two sets differenced by subtracting the measurements in the $(i-1)^{th}$ dwell from those in the $i^{th}$. The differenced frequency is accurately approximated by $$\Delta f = f_o \left| \frac{\ddot{r}}{c} \right| \Delta t \tag{2a}$$

where $\ddot{r}$—the acceleration of the observer along the emitter DOA
$f_o$—the emitter RF frequency in the observer rest frame
c—speed of light
$\Delta t$—time seperating differenced measurements
and the differenced fundamental time interval is $$\Delta t_p = -t_{p_o} \left| \frac{\ddot{r}}{c} \right| \Delta t \tag{2b}$$

with $$t_{p_o} = \frac{1}{\text{rest PRF frequency}}.$$

Figure 5:
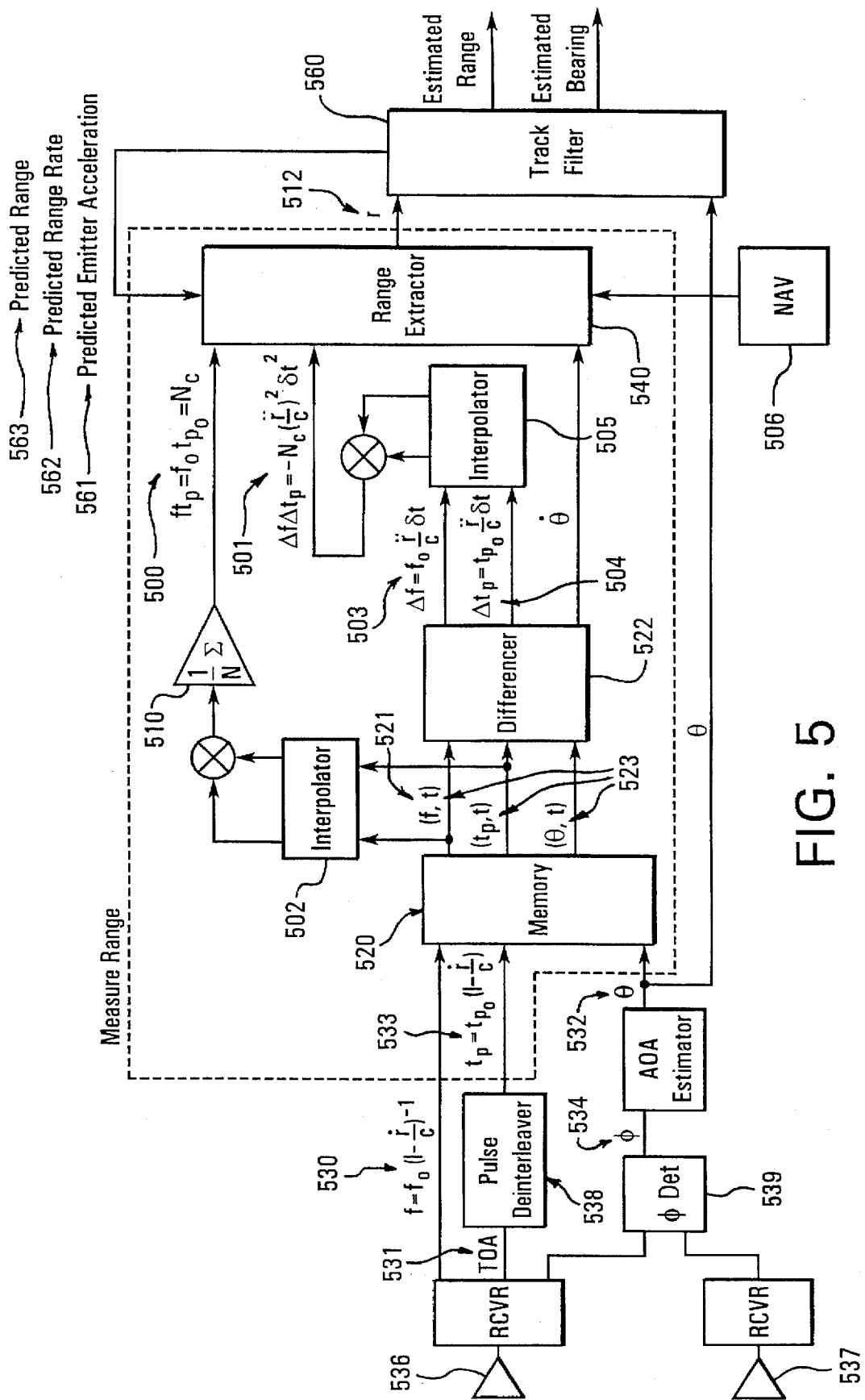
FIG. 5 is a detailed block-schematic diagram of the second preferred embodiment of a passive emitter locating apparatus according to the invention.

The product of Equation (2a) and Equation (2b), i.e., Equation 1 or 501 FIG. 5, thus involves the fundamental constant $f_o t_{p_o} = N_c$ which is known, rather than the unknown individual quantities $f_o$ and $t_{p_o}$, and hence, as noted above, the acceleration toward the emitter can be estimated by $$\ddot{r} = c \left( \frac{\Delta f \Delta t_p}{-N_c} \right)^{1/2} (\Delta t)^{-1} \tag{3}$$

Range can then be measured in the Extract Range process (540, FIG. 5) using Equation 3 as follows. The radial kinematical acceleration $\ddot{r}$ is related to range $r$ by $$\ddot{r} - r\dot{\theta}^2 = a_r \tag{4}$$

where $\dot{\theta}$ is the signal AOA rate-of-change and $a_r$ the relative physical acceleration of the observer and emitter. Once the AOA rate is measured Equation 4 can be used with Equation 3 to measure range. In doing this there are three cases to consider based on $a_4$.

Figure 1A:
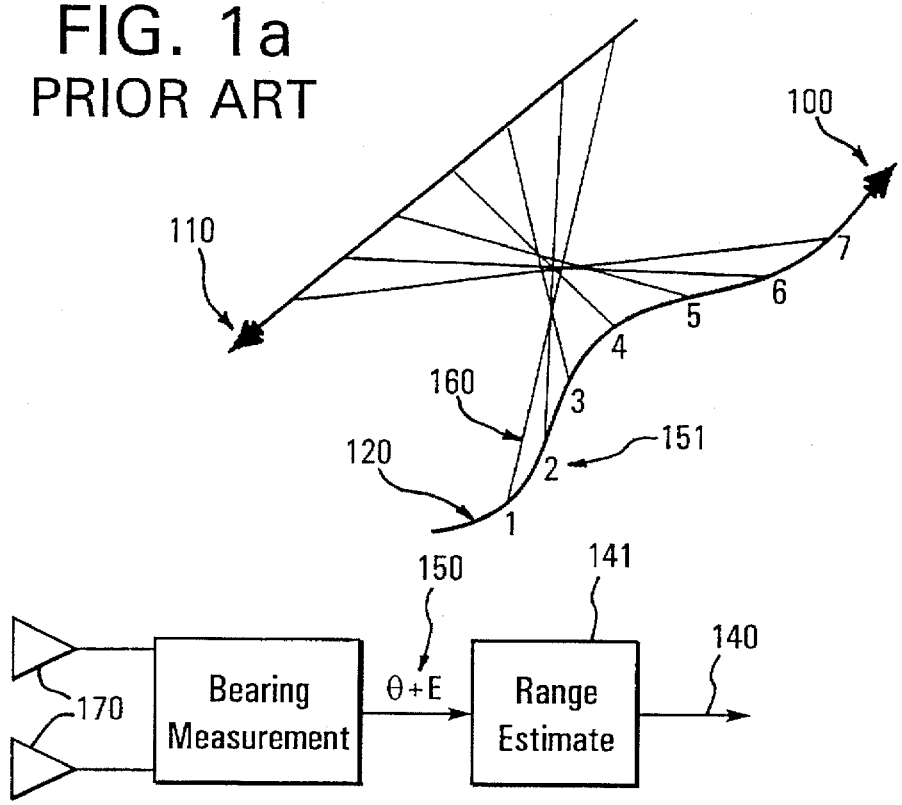
FIG. 1a is a block-schematic diagram of prior art bearings-only passive ranging system.
Figure 1B:
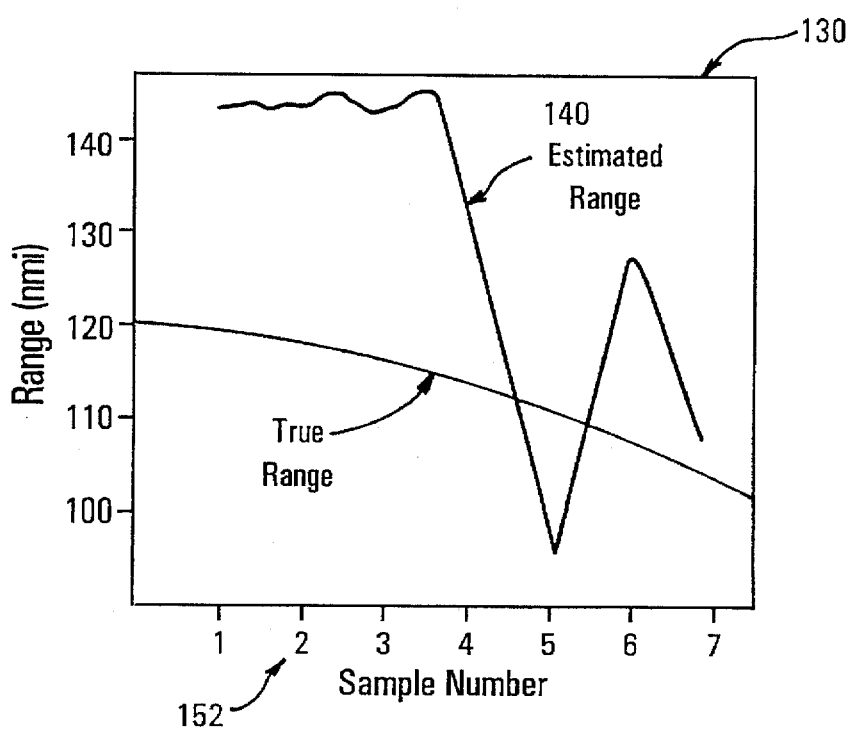
Figure 2A:
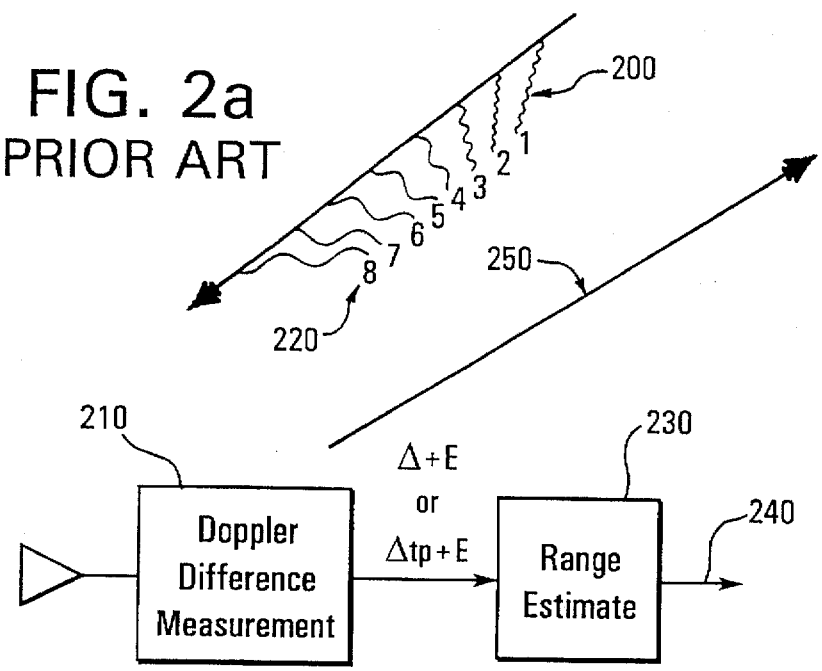
FIG. 2a is a block-schematic diagram of a prior art Doppler passive ranging system and an illustration of the relation between observer and emitter.
Figure 2B:
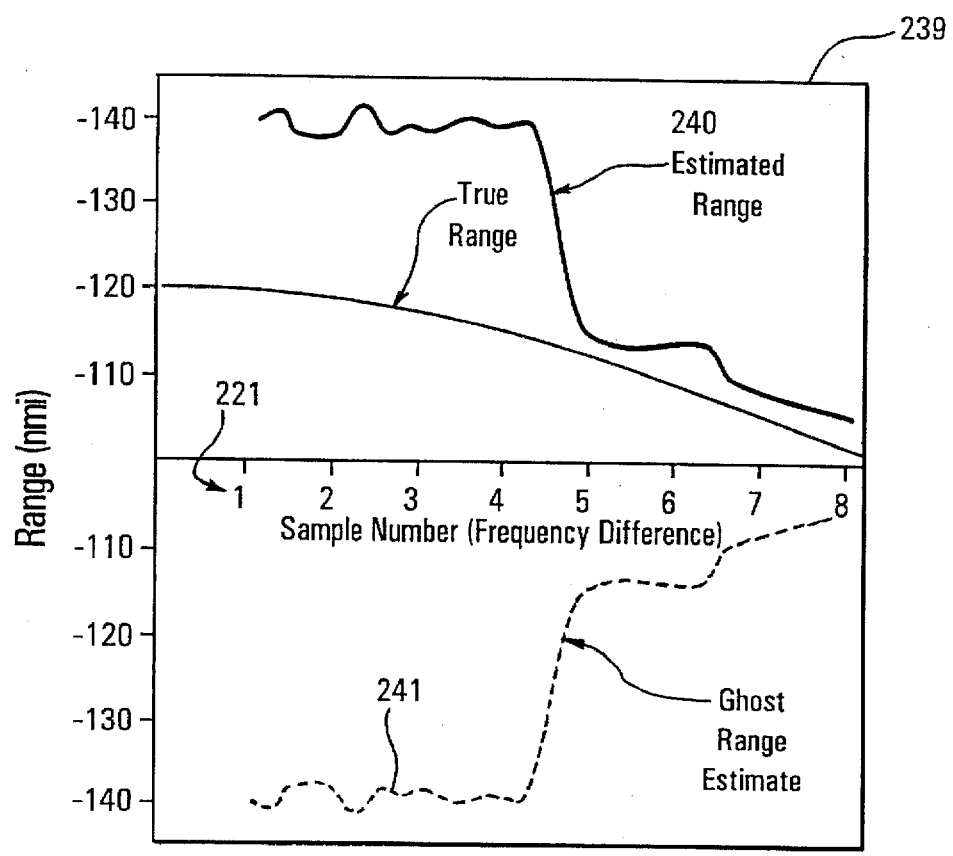
FIG. 2b is a range diagram resulting from the operation of the FIG. 2a system as there shown.

In the important case of constant relative motion, the relative physical acceleration is zero and Equation 4 provides an exact solution for range. This case contains the special situation of a stationary emitter. Note further that when $a_r=0$ the ghost or ambiguous solution in the Doppler change-only approach illustrated in FIG. 2 and described by Yiu-Tong Chart and Frederick L. Jardine in their IEEE paper is eliminated, and also that range is obtained with no observer maneuver, unlike the bearings-only technique analyzed by Aidala and Hamel and illustrated in FIG. 1.

If the observer maneuvers during the measurements, but the target is constant velocity, then the right hand side of Equation 4, although no longer zero, is known from NAV system measurements (506 FIG. 5). Thus Equation 3 and Equation 4 once more provide an exact solution for range.

In contrast to these constant emitter velocity cases, emitter maneuvers represent an unknown element in the physical acceleration, and such maneuvers generate an error in the range measurement. But this error is proportional to the time over which the Doppler and AOA rate measurements are made, and so it can be controlled by specifying the correct system measurement accuracies, and thus restricting these times.

The range error due to measurement noise and unknown target accelerations appears as a random quantity varying from update to range update, and can be averaged out in a tracking filter that accepts as inputs the noisy range measurement and emitter relative bearing. This tracking filter generates at least target velocity as well as smoothed range. It may also, using well known estimation methods, generate estimated target accelerations. When target predicted acceleration is available, it may be fed back to the range extraction process to improve the range measurement accuracy.

FIG. 5 shows in greater detail how carrier frequency f, pulse repetition frequency $p_{RF}$, and angle of arrival or bearing rate measurements are combined to form the range measurement. In particular, this Figure illustrates the aspects of the $f/f_{PRF}$, or equivalently fundamental constant $N_c$, measurement relevant for this invention.

Essentially, pulse time-of-arrival 531 (TOA), frequency measurements 530, and signal relative bearing 532 are made during a single dwell. The relative bearing is measured by conventional phase interferometry employing at least one pair of antennas 536 and 537, between which signal phase 534 is detected 539, and from the measured phase the AOA 532 estimated. The fundamental period 533 $t_p = 1/f_{PRF}$ is extracted from the TOA measurements by the pulse deinterleaver 538. The $t_p$ time difference is the greatest common divisor of all the interpulse time intervals. As discussed in the applicant's commonly assigned U.S. patent application Ser. No. 08/499,825, filed Jul. 10, 1995 entitled "Emitter Frequency-Time Measurement by a Moving Observer Using No Navigation Inputs", the deinterleaver has the capabilities of the Litton Systems, Amecom Division's Advanced ADV-CAP deinterleaver developed for the AN/ALQ-99 jamming system, and hence extracts $t_p$ from the TOA measurements as part of the pulse deinterleaving process.

Through time synchronization via interpolation 502, as also discussed in the above-mentioned patent application "Emitter Frequency-Time Measurement by a Moving Observer Using No Navigation Inputs", simultaneous carrier frequency and $t_p$ estimates are multiplied together to form the constant 500 $N_c$. The accuracy of this estimate can be brought to any level of refinement desired since the value being estimated is the same constant for all measurements made on a given frequency stable emitter. Hence the process 510 represents an average not just on all $f/f_{PRF}$ estimates in a single dwell, but also across all dwells.

The parameters f, $t_p$, and $\theta$ measured in a single dwell are stored in memory 520, along with the times 521 the measurements were made, and after the second and subsequent emitter dwell these measurement sets 523 are differenced 522 by subtracting the measurements in the previous dwell from the corresponding measurements in the current dwell. The frequency difference 503, and fundamental pulse repetition time difference 504 are interpolated 505 to generate simultaneous values which are multiplied together to obtain the basic relationship 501. This product, when combined with the estimate 500 of $N_c$ and angle rate estimate $\dot{\theta}$ (532) in a manner consistent with Equations 3 and 4 in the Extract Range process 540 generate the range measurement r.

When generating an accurate estimate of range, the process Extract Range uses the well known techniques of modern applied estimation theory in order to exploit the multiple records of $\Delta f \Delta t_p$ and $\dot{\theta}$ available for a dwell-pair of parameter measurements, and also to account for measurement error correlation between $N_c$ and $\Delta f \Delta t_p$. But the basis for this estimation approach is the relationship between the measured parameters and range given by $$r = c \left( \frac{\Delta f \Delta t_p}{-N_c} \right)^{1/2} (\Delta t \dot{\theta}^2)^{-1} - \frac{a_r}{\dot{\theta}^2} \quad (6)$$

As discussed previously, $a_r$ may have an unknown component due to emitter maneuvers. The component due to observer maneuvers is measured by the NAV system 506.

Figure 3A:
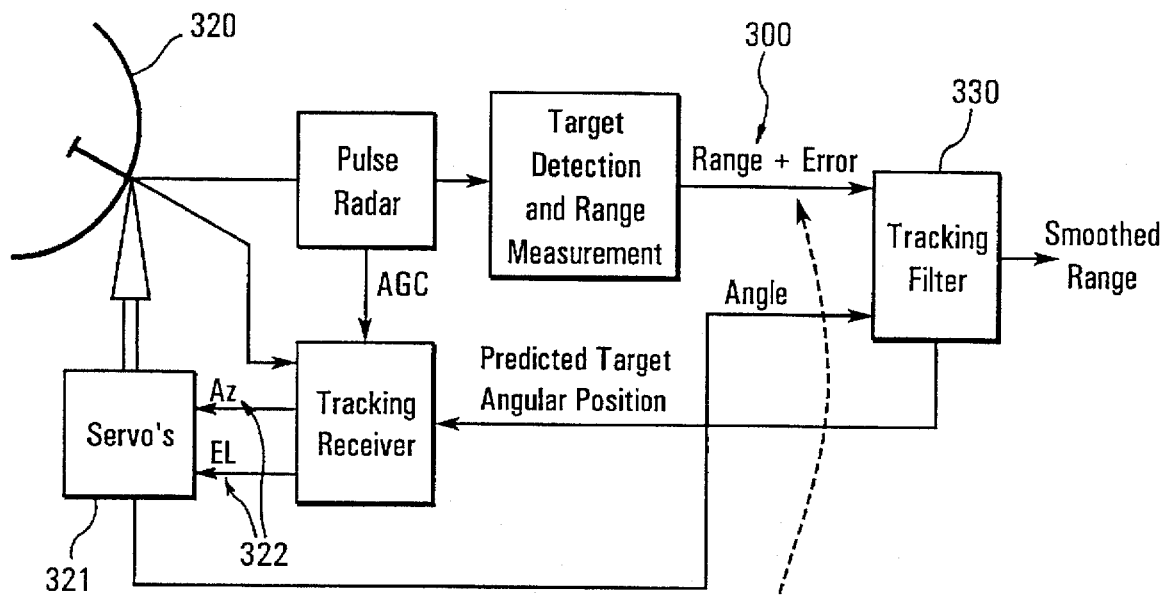
FIG. 3a is a block-schematic diagram of a prior art tracking radar system.
Figure 3B:
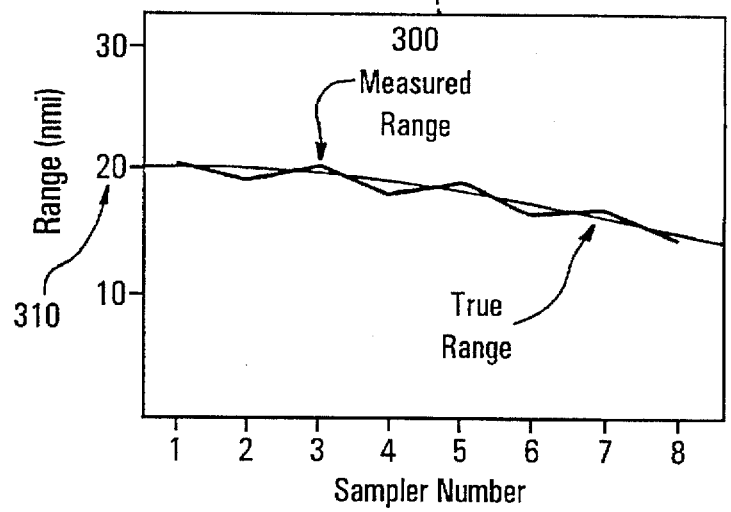
FIG. 3b is a range diagram resulting from typical operations of the FIG. 3a system.

The range measurement 512 and relative bearing measurement 532 are input to the emitter tracking filter 560. This filter, employing the well known techniques established for tracking targets with an active radar (330, FIG. 3), reconstructs and smooths the target position and velocity from the noisy range and angle measurements. The tracking filter may also estimate target accelerations. When such estimates are part of the target track state vector, predicted accelerations 561 are fed back to the Extract Range process to reduce the error in the radial acceleration term $a_r$ in Equation 5. In all cases the predicted range 562 and range rate 563 are fed back to aid in the range extraction by providing a consistency check.

FIGS. 6a–d illustrate performance when the tracking filter does not estimate target acceleration, i.e., prediction 561 is not available. FIG. 6a illustrates the emitter track flown in a simulation consisting of constant velocity segments interspersed with 8 g turns. The initial relative bearing 601 was 60°, and the initial range 602 was 120 nmi. Mainbeam and sidelobe detection of airborne emitters at such ranges is well within the capability of modern intercept receivers. Graph 610 in FIG. 6b shows the error in estimating the fundamental constant $N_c$. An important feature of the error curve 611 is that it illustrates the insensitivity of this estimate to unknown maneuvers. This insensitivity arises from the cancellation properties intrinsic to the time-frequency product.

Graph 620 in FIG. 6c shows the range estimate output from the process Extract Range (540 FIG. 5). The range estimate curve 621 clearly indicates the increase in errors at 5 and 14 seconds due to emitter maneuvers. The range error during the maneuvers is about 16%. The error is about 4% when no maneuvers are present.

Even larger errors are easily reduced by a tracking filter (560, FIG. 5), as indicated by graph 630 in FIG. 6d. In contrast to conventional passive location estimators, the range estimate is available after the second dwell measurement. The range estimate 631 output from the tracking filter was determined in conjunction with the emitter velocity. As noted above, the tracking filter in this realization did not estimate target accelerations, and hence the range errors occurring in the range measurement 621 were controlled only by the system measurement accuracies. The measurement performance assumed in the simulation was: pulse time-of-arrival (TOA) measurement resolution of 2.5 nsec, frequency accuracy of 5 Hz, and angular rates measured with a resolution of 0.1° per second. The observer flew the constant velocity track 603. No observer maneuver was required to initially obtain range estimates, nor was the range measured ambiguous in any way.

Although the tracking filter used to generate the estimated range 631 used a state model in the filter similar to that used by active radar tracing filters, the measurement model of the statistics was different. This difference was necessary to account for the correlation between the range measurement 512 and angle input 532 arising from the range extraction process 540. The manner such correlations are accounted for is well known to those versed in the art of designing optimal estimators.

The principles of this invention are described hereinabove by describing preferred embodiments thereof constructed accordingly. It is to be remembered that the described embodiments may be modified or changed without departing from the invention as defined by the appended claims.

I claim:

1. A method for the passive tracking of pulse echo radars, comprising the steps of:

first, measuring the emitter relative bearing, second, measuring emitter pulse carrier frequency (f)

third, measuring emitter pulse time of arrival (TOA), storing the results of said firsts, second and third measurements in a dwell set, the set containing measurements made over a time period comprising multiple contiguous pulses together with the system time at which each individual measurement was made, deriving a fundamental time period ($t_p$) from said third measurements in a said dwell set, differencing the values, respectively, of said first and second measurements and the values of said time periods ($t_p$) between two dwells, combining the values of said first measurement differences and the time over which they occurred to obtain a bearing rate value, adjusting, using recorded system time at which the measurements were made, the differences to provide simultaneous estimates Of the frequency and time difference, multiplying the simultaneous ($t_p$) and frequency values realized from said adjusting step, interpolating, by using recorded system times at which the measurements were made, frequency (f) and fundamental time period ($t_p$) values to obtain simultaneous estimates thereof multiplying the simultaneous values obtained in said interpolating step and averaging the product to obtain an estimate of $N_c$, where $N_c$ is the number of cycles of RF carrier occurring in a fundamental repetitive time interval ($t_p$) derived from the pulse repetition intervals, where this time interval is a recurring time difference in the emitter signal when measured in the coordinate system moving with the observer, valuing the relative acceleration along the signal angle of arrival (AOA) using the products of said first multiplying step and the product of said second multiplying step and determining the emitter range from the observer using the result of said combining step, the result of said valuing step and the bearing rate measurement step.

2. Method described in claim 1 comprising the additional steps of:

combining the result of said determining step with estimated emitter velocity to predict emitter position and comparing the result of said determining step with the predicted range.

3. Apparatus for the passive tracking of pulse echo radars, comprising:

first measuring means for producing an output signal corresponding to emitter relative bearing, second measuring means for producing an output signal corresponding to emitter pulse carrier frequency (f), third measuring means for producing an output signal corresponding to emitter pulse time of arrival (TOA), storage means for storing the outputs from said first, second and third measuring means in a dwell set, each said set containing measurements made over a time period involving multiple contiguous pulses together with the system time at which the individual measurements were made, means for deriving the fundamental time period ($t_p$) from the TOA measurements in a dwell, means for producing different signals corresponding, respectively, to the output signal values from said first and second measuring means and said deriving means between at least two dwells, means for combining the differences in values between the output signals from said first measuring means and the time over which they occurred to obtain a measurement of the bearing rate, first means for adjusting using recorded system time at which the measurements were made the outputs from said differencing means to provide simultaneous estimates of frequency and time difference, first multiplier means for producing a first product signal of said simultaneous time and frequency differences, second means for adjusting utilizing recorded system times at which the measurements were made the values of said second measuring means output signal and output from said deriving means to obtain simultaneous estimates of pulse carrier frequency and fundamental time period ($t_p$), second multiplier means for producing for producing a second product signal which is the product of the outputs of said second adjusting means and for averaging the result to obtain an estimate of $N_c$ where $N_c$ is the number of cycles of RF carrier occurring in a fundamental repetitive time interval ($t_p$) derived from the pulse repetition intervals, where this time interval is a recurring time difference in the emitter signal when measured in the coordinate system moving with the observer, first measuring means for determining the relative acceleration along the signal angle of arrival (AOA) using the ratio of second product signals and said first product signal and second measurement means using the value of the output signal from combining means and bearing rate measurement to determine the emitter range from the observer.

4. The apparatus described in claim 3 further comprising:

a tracking filter having a filter algorithm, third adjusting means for initially adjusting measurement errors assumed in the filter algorithm based on system frequency, TOA and bearing measurement errors, means for predicting emitter position by combining the output said second measuring means with estimated emitter velocity, including comparing means for comparing the range measured and fourth means for adjusting the measurement errors assumed in the tracking filter based on the discrepancy between the predicted and measured range values.

5. The apparatus described in claim 4 wherein said tacking filter also estimates emitter acceleration and this estimated acceleration is extrapolated in time to the next dwell set in order to predict the emitter acceleration to thereby reduce the error in range measurement introduced by the unknown component of the acceleration.

6. The apparatus described in claim 5 further comprising:

means for computing the error representing the discrepancy between the actual range measurement and the predicted range as a function only of the neglected emitter acceleration, means for estimating an emitter acceleration along the line of sight to the emitter that minimizes the error determined by said error computing means, means for predicting emitter acceleration at the next dwell using range, velocity and acceleration estimated by the tacking filter, means for incorporating said predicted acceleration in the range measurement to reduce the range measurement error caused by emitter accelerations, and fifth means for adjusting the measurement errors assumed in the tracking filter to account for the error correlations between the measured range and estimated range, velocity and acceleration.

* * * * *